US010817003B2

(12) United States Patent
Amadini

(10) Patent No.: US 10,817,003 B2
(45) Date of Patent: Oct. 27, 2020

(54) SETTING DEVICE FOR A GAS PRESSURE REGULATOR, IN PARTICULAR FOR A PILOT DEVICE, AND GAS PRESSURE REGULATION SYSTEM COMPRISING SAID SETTING DEVICE

(71) Applicant: PIETRO FIORENTINI S.P.A., Arcugnano (VI) (IT)

(72) Inventor: Armando Amadini, Castel Mella (IT)

(73) Assignee: Pietro Fiorentini S.P.A., Arcugnano (IT)

(*) Notice: Subject to any disclaimer, the term of this patent is extended or adjusted under 35 U.S.C. 154(b) by 0 days.

(21) Appl. No.: 16/311,113

(22) PCT Filed: Jul. 21, 2017

(86) PCT No.: PCT/IB2017/054431
§ 371 (c)(1),
(2) Date: Dec. 18, 2018

(87) PCT Pub. No.: WO2018/020378
PCT Pub. Date: Feb. 1, 2018

(65) Prior Publication Data
US 2019/0179349 A1    Jun. 13, 2019

(30) Foreign Application Priority Data
Jul. 28, 2016    (IT) .................... 102016000079425

(51) Int. Cl.
*F16K 31/40*    (2006.01)
*G05D 16/16*    (2006.01)
(Continued)

(52) U.S. Cl.
CPC ....... *G05D 16/163* (2013.01); *G05D 16/0636* (2013.01); *G05D 16/2095* (2019.01)

(58) Field of Classification Search
CPC ............. G05D 16/163; G05D 16/2095; G05D 16/0636
(Continued)

(56) References Cited

U.S. PATENT DOCUMENTS 3,020,925 A * 2/1962 Randall ................. F16K 31/365
137/489.5
3,592,223 A * 7/1971 Reese ..................... F16K 31/36
137/469
(Continued)

FOREIGN PATENT DOCUMENTS

JP    2 165 372 A    4/1986
JP    63-71711 A    4/1988
(Continued)

OTHER PUBLICATIONS

International Search Report and Written Opinion dated Nov. 9, 2017, issued in PCT Application No. PCT/IB2017/054431, filed Jul. 21, 2017.

*Primary Examiner* — Minh Q Le
(74) *Attorney, Agent, or Firm* — Workman Nydegger

(57) ABSTRACT

Setting device for a pressure regulator includes a tubular casing developing according to a longitudinal axis (X) and in which there are a movable body, a sliding setting plate and a spring interposed between them; an adjusting unit suited to adjust the position of the setting plate and having a first rotating shaft connected to the setting plate through a screw mechanism which converts opposite rotations of the first shaft into corresponding opposite movements of the setting plate along the longitudinal axis (X), and an electric motor powered by a control device and provided with a second shaft constrained to the first shaft. The control device includes two different input lines to receive corresponding electric signals and an output line to supply power to the electric motor and is configured to transmit an electric pulse
(Continued)

emitted by any of the input lines to the output line with polarity depending on the input line which emitted the electric pulse.

11 Claims, 2 Drawing Sheets

(51) Int. Cl.
 *G05D 16/20* (2006.01)
 *G05D 16/06* (2006.01)
(58) Field of Classification Search
 USPC ......... 137/489.5, 505, 505.21, 505.24, 487.5
 See application file for complete search history.

(56) References Cited

U.S. PATENT DOCUMENTS

| | | | | |
|---|---|---|---|---|
| 4,791,954 A * | 12/1988 | Hasegawa | ............ | G05D 16/202 137/487.5 |
| 5,967,176 A * | 10/1999 | Blann | ................... | F16K 31/365 137/488 |
| 6,366,041 B1 * | 4/2002 | Bozio | ..................... | B61L 7/083 246/132 |
| 6,595,237 B2 * | 7/2003 | Cecchinato | .......... | G05D 16/163 137/488 |
| 7,520,297 B2 * | 4/2009 | Bell | ....................... | G05D 16/10 137/505.11 |
| 8,091,582 B2 * | 1/2012 | Folk | ...................... | F16K 31/365 137/489 |
| 8,276,612 B2 * | 10/2012 | Folk | ...................... | F16K 31/365 137/489 |
| 10,443,750 B2 * | 10/2019 | Parastar | ................ | F16K 15/025 |
| 2006/0158140 A1 * | 7/2006 | Furuki | ..................... | H02P 5/68 318/68 |
| 2008/0055546 A1 * | 3/2008 | DeCusatis | .............. | G03B 35/04 353/7 |
| 2011/0235472 A1 * | 9/2011 | Hasegawa | ............... | G04C 3/143 368/80 |
| 2015/0247901 A1 * | 9/2015 | Okada | .................... | G01R 31/34 324/765.01 |
| 2016/0102811 A1 * | 4/2016 | Imboccioli | .......... | G05D 16/163 |
| 2017/0359012 A1 * | 12/2017 | Pietromonaco | ....... | H02P 25/086 |
| 2018/0181147 A1 * | 6/2018 | Bodei | ................. | G05D 16/163 |
| 2018/0275694 A1 * | 9/2018 | Imboccioli | ........ | G05D 16/0402 |
| 2019/0283072 A1 * | 9/2019 | Woodlief | ............. | B05C 11/1013 |

FOREIGN PATENT DOCUMENTS

| | | |
|---|---|---|
| JP | 05-313755 A | 11/1993 |
| JP | 200-172344 A | 6/2000 |

* cited by examiner

SETTING DEVICE FOR A GAS PRESSURE REGULATOR, IN PARTICULAR FOR A PILOT DEVICE, AND GAS PRESSURE REGULATION SYSTEM COMPRISING SAID SETTING DEVICE

BACKGROUND OF THE INVENTION

1. The Field of the Invention

The present invention concerns a setting device for a gas pressure regulator, particularly suitable for use in natural gas distribution systems.

In particular, the present invention concerns a setting device particularly suited to control the setting of a pilot device of a gas pressure regulator.

2. The Relevant Technology

As is known, natural gas is distributed to utilities through dedicated distribution systems.

In order to guarantee the safety and continuity of delivery, the pressure of the gas at the points of delivery must be kept constant regardless of the flow rate and the pressure of the gas that feeds the distribution system.

These conditions are achieved by the use of pressure regulators which, fed by gas flowing through lines at a higher pressure, convey the gas to the point of delivery at a lower and almost constant pressure.

Generally, a pressure regulator of the known type comprises a movable shutter associated with a counteracting spring and a membrane subject to a control pressure which varies according to the delivery pressure downstream of the regulator.

When the delivery pressure tends to decrease with respect to the set value, the control pressure is modified in such a way as to move the membrane and, hence, the regulator shutter, which is suited to bring the delivery pressure back to the aforementioned set value.

In order to obtain high precision regulation, it is known to deliver the control pressure via a pilot device which, structurally, is similar to the main pressure regulator. In particular, the pilot device is equipped with a shutter associated with a counteracting spring and a membrane subject to a corresponding control pressure which is generally the delivery pressure present in the pipe downstream of the main pressure regulator.

In order to be able to remotely control the pressure automatically and to improve the regulation precision, especially in the presence of temperature changes, it is known to use a setting unit which is associated with the pilot device and suited to modify the setting value of the latter. The setting unit comprises a tank communicating with an auxiliary chamber closed by an additional membrane, which is connected to the counteracting spring of the pilot device so as to exert on the latter a force that depends on the existing pressure in the tank.

The pressure in the tank is controlled by means of two solenoid valves, respectively intended to let pressurized gas in the tank and to discharge it from the tank into the atmosphere. The two solenoid valves are actuated by a control device based on the operating parameters of the system, in particular the pressure and the temperature downstream of the pressure regulator.

While the control system with the setting unit described above is suitable for pressure regulation in high pressure systems, it is less suitable for low pressure systems, like for example in the case of gas distribution systems for domestic users. Indeed, in these applications the pressure in the tank is reduced and therefore the solenoid valves do not allow the pressure to be regulated with sufficient precision.

The regulation system of the known type described above poses a further drawback related to the fact that the operations to modify the setting involve the discharge of a certain amount of gas contained in the tank into the atmosphere, which results in a corresponding waste of gas.

Document JP S6371711 describes a setting device for setting a pressure regulator, comprising a tubular casing developing according to a longitudinal axis and provided with an open first end, a movable body movably associated with said tubular casing in such a way as to face said first end, a setting plate slidingly associated with said tubular body and said setting plate, a spring interposed between said movable body and said setting plate and an adjusting unit to adjust the position of said setting plate according to said longitudinal axis, wherein said adjusting unit comprises screw means to connect said setting plate to said first shaft in such a way that rotations of said first shaft according to mutually opposite directions cause corresponding movements of said setting plate along said longitudinal axis according to two mutually opposite directions, an electric motor provided with a second shaft rotatably constrained to said first shaft through a connection unit and a control device to power said electric motor.

Document JP H05 313755 shows a pressure regulator wherein the electric motor is also controlled to move the screw in both directions up and down.

SUMMARY OF THE INVENTION

The present invention intends to overcome all of the aforementioned drawbacks related to the prior art.

In particular, it is one object of the present invention to provide a setting device for a pressure regulator, in particular for a remote-controlled pilot device.

It is also an object of the invention to provide a setting device which allows the setting of the pilot device to be controlled more precisely compared to a setting device of the known type and which therefore is suitable for use in low pressure systems.

It is also an object of the invention to provide a setting device which is constructively simpler than a setting device of the known type.

It is a further object of the invention to provide a setting device which may be used to replace the setting devices of the known type already installed, with no need to make special adaptations to the system.

In particular, it is an object of the invention to provide a setting device which has a low consumption of electricity, so that it can be powered by a battery while maintaining a high degree of operating autonomy.

It is a further object of the invention to provide a setting device which does not discharge gas into the atmosphere during the modification of the setting.

It is another object of the invention to provide a setting device which is readily adaptable to a wide range of operating pressures.

These objects are achieved by a setting device for a gas pressure regulator in accordance with the main claim.

The above mentioned objects are also achieved by a system for gas pressure regulation in a pipeline.

Further characteristics and details of the invention are described in the related dependent claims.

Advantageously, greater precision makes the setting device that is the subject of the invention more suitable for use in low pressure systems compared to the setting devices of the known type.

Moreover, advantageously, the interchangeability of the setting device of the invention with a setting device of the known type and the fact that it is adaptable to a wide range of operating pressures make the setting device of the invention particularly versatile.

BRIEF DESCRIPTION OF THE DRAWINGS

The above mentioned objects and advantages, together with others that are described here below, are highlighted in the following description of a preferred embodiment of the invention with reference to the attached drawings, in which.

DETAILED DESCRIPTION OF THE PREFERRED EMBODIMENTS

Figure 1:
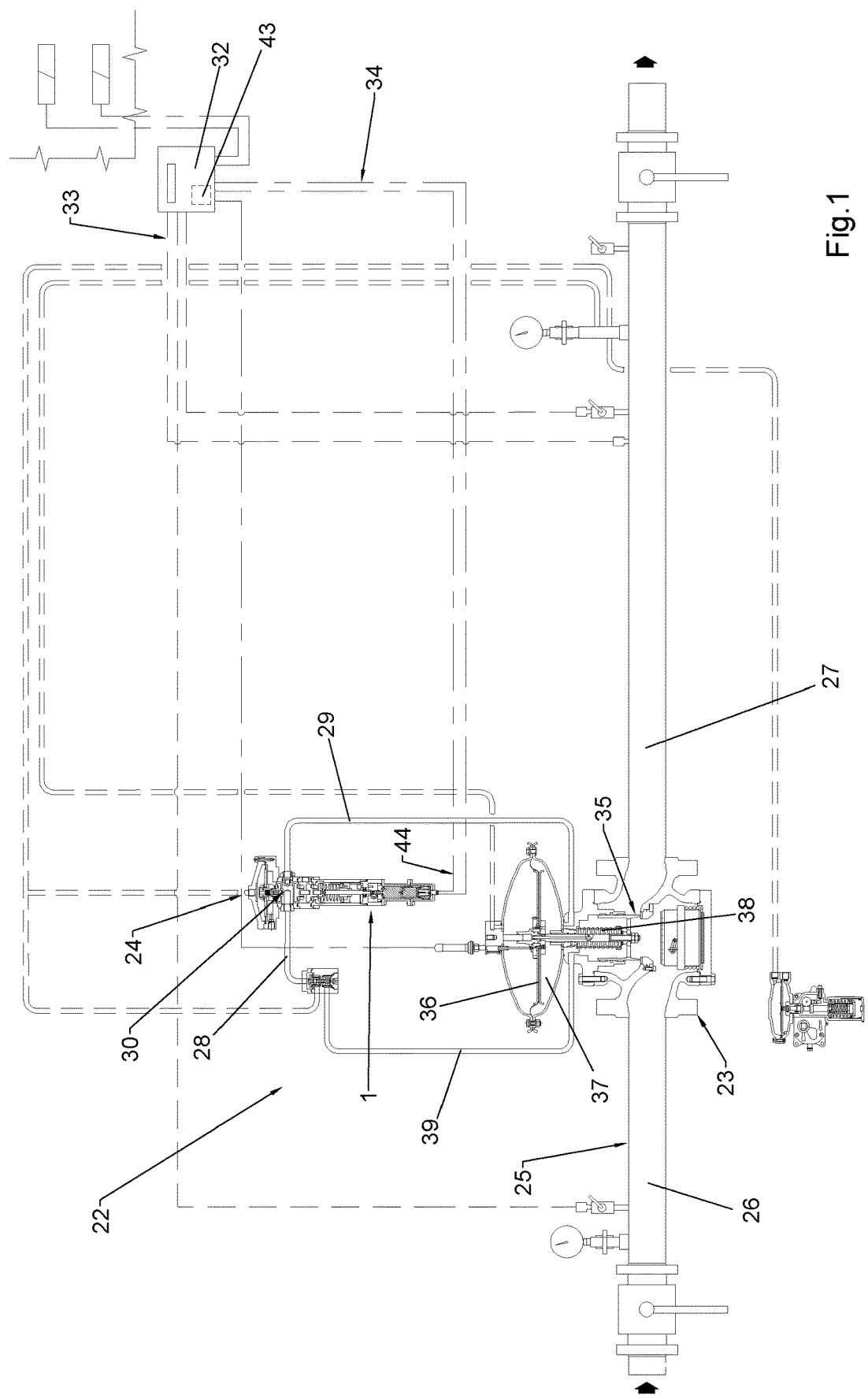
FIG. 1 shows a diagram of the gas pressure regulation system according to the invention, in which the main pressure regulator, the pilot device and the pipeline are shown in sectional views.

The setting device of the invention, particularly suited to control a gas pressure regulator in a distribution system, will be described with reference to a gas pressure regulation system represented schematically in FIG. 1, where it is indicated as a whole by 22.

The regulation system 22 has the function of regulating the pressure of a gas supplied to a user and, in particular, of maintaining it at a constant value, regardless of the pressure of the gas that feeds the regulation system 22 and of the flow rate supplied to the user.

The regulation system 22 comprises a pressure regulator 23 located along a pipe 25 in which gas flows. Therefore, in the pipe 25 it is possible to identify an area 26 located upstream of the regulator 23, in which there is gas at a given supply pressure, and an area 27 located downstream of the regulator, in which there is gas at a lower delivery pressure compared to the supply pressure, said delivery pressure being regulated by the regulation system 22.

The pressure regulator 23 includes a shutter 35 that separates the upstream area 26 from the downstream area 27 and defines a choke through which a gas pressure drop takes place, from the supply pressure to the delivery pressure. The delivery pressure can be regulated by varying the cross section of the choke, that is, by moving the shutter 35.

The movement of the shutter 35 is preferably obtained by means of a movable membrane 36 associated with the shutter 35, so that its movements can be transferred to the shutter.

The membrane 36 partially delimits a drive chamber 37 in which there is a control pressure which is dependent on the above mentioned delivery pressure. The membrane 36 is also associated with a spring 38 which counteracts the control pressure. Consequently, a change in the control pressure causes the displacement of the membrane 36 and, hence, of the shutter 35, so as to alter the pressure drop through the choke and, consequently, the delivery pressure, until the balance between the control pressure and the force exerted by the spring 38 is restored.

The control pressure is supplied to the pressure regulator 23 by a pilot device 24 connected to the downstream area 27 of the pipe 25 through an inlet duct 28 and further connected to the drive chamber 37 of the pressure regulator 23 via an outlet duct 29.

Figure 2:
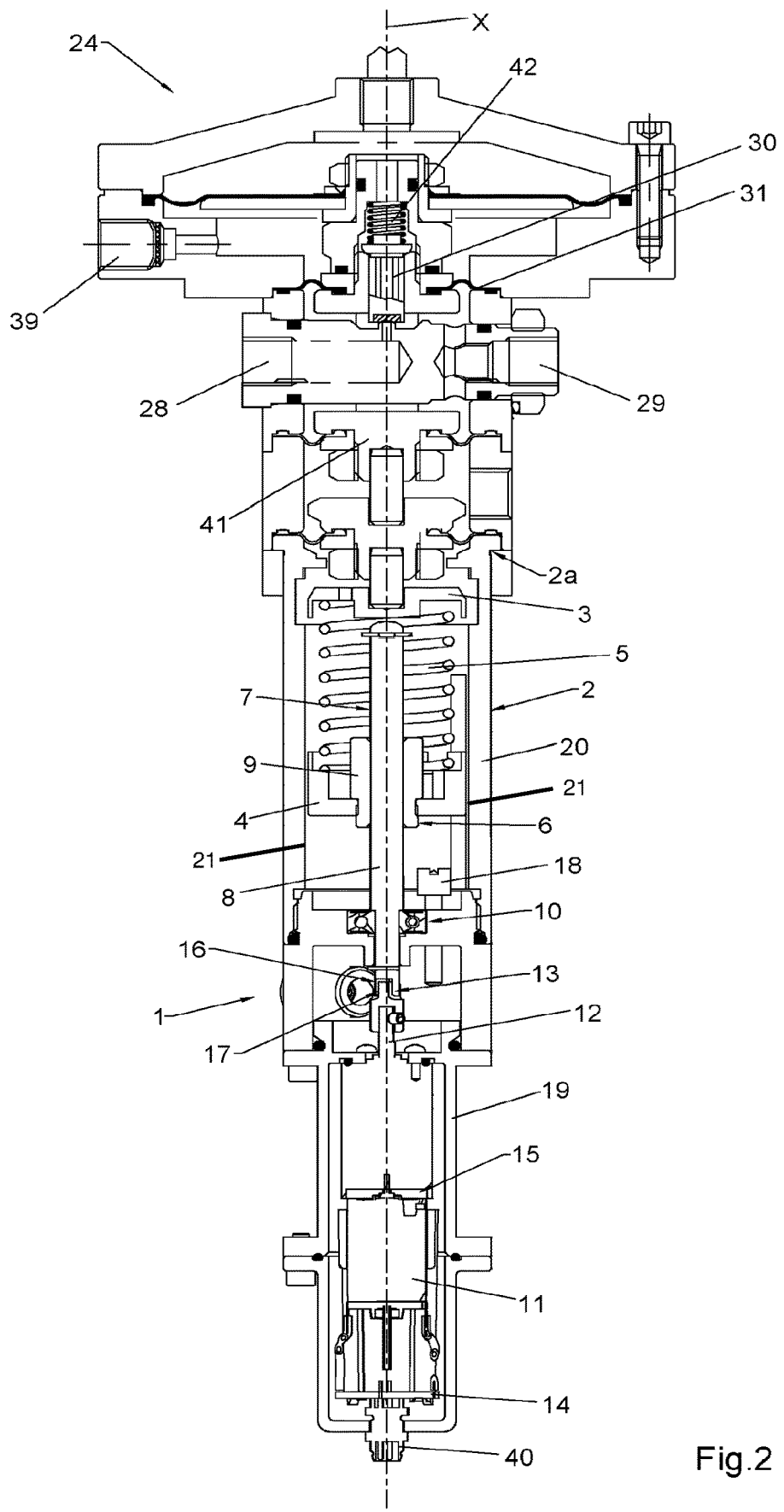
FIG. 2 shows a detailed view of the system of FIG. 1, illustrating the pilot device with which the setting device of the invention is associated.

The pilot device 24, shown in detail in FIG. 2, is equipped with a regulating valve 30 which causes a pressure drop between the inlet duct 28 and the outlet duct 29, the pressure drop depending on the degree to which the regulating valve 30 is opened.

Analogously to what happens with the pressure regulator 23, even the above mentioned regulating valve 30 is controlled by a counteracting spring 42 against which there is a pilot pressure transmitted to the regulating valve 30 by means of a membrane 31. Preferably, said pilot pressure is the pressure of the downstream area 27 of the pipe 25, which is drawn by a pilot pipe 39.

The regulation system 22 also comprises a setting unit configured to exert a counteracting force which opposes the force exerted by said pilot pressure on the regulating valve 30 of the pilot device 24. Specifically, the setting unit can be activated to modify said counteracting force and, therefore, modify the setting of the pilot device 24. The setting unit thus makes it possible to indirectly act on the control pressure of the pressure regulator 23, in order to maintain the delivery pressure as constant as possible with the changing of the gas supply and delivery conditions, particularly the flow rate, the supply pressure and the temperature.

In particular, the setting unit comprises a setting device 1 associated with the pilot device 24. Said setting device 1 comprises a tubular casing 2 which extends along a longitudinal axis X and is provided with a first open end 2a communicating with the pilot device 24.

A movable body 3 is located in the tubular casing 2 in such a way that it faces said first end 2a and can transmit a force to the regulating valve 30 of the pilot device 24 through suitable transmission means 41.

In addition, in the tubular casing 2 there is a setting plate 4, slidingly associated with the tubular casing 2 according to the direction of the longitudinal axis X.

Preferably, guide profiles 21 are provided which are suited to constrain the setting plate 4 to the tubular casing 2, so as to prevent any mutual rotation according to the longitudinal axis X.

Between the movable body 3 and the setting plate 4 there is a spring 5, the elastic force of which is discharged on the movable body 3 and hence on the regulating valve 30 of the pilot device 24 in the manner described above.

The setting device 1 furthermore comprises an adjusting unit 6 suited to adjust the position of the setting plate 4 according to the direction of the longitudinal axis X.

In particular, said adjusting unit 6 comprises a first shaft 8 rotatably associated with the tubular casing 2 along the longitudinal axis X, which is connected to the setting plate 4 through screw means that transform the rotations of the first shaft 8 according to two mutually opposite directions into corresponding movements of the setting plate 4 along the longitudinal axis X in two mutually opposite directions.

There is also an electric motor 11 equipped with a second shaft 12 rotatably constrained to the first shaft 8 through a connection unit 13. The electric motor 11 is activated by a control device 14 which is preferably an electronic board able to power the electric motor 11 so as to cause its rotation in either of the two directions.

It is understood that the activation of the electric motor 11 in one of the two mutually opposite directions causes the axial displacement of the setting plate 4, respectively in the two mutually opposite directions, which in turn increases or decreases the compression of the spring 5 and therefore increases or decreases the force exerted by the movable body 3 on the regulating valve 30 of the pilot device 24. In this way, it is possible to adjust the control pressure delivered by the pilot device 24 to the pressure regulator 23, with no need to provide a tank, two solenoid valves for filling and emptying the tank itself, and a membrane that transfers the tank pressure to the spring of the pilot device, as is the case in the prior art.

This achieves the object to obtain a regulation system 22 which is constructively simpler than the regulation systems of the known type with equivalent functionality.

The control device 14 is equipped with two different input lines 44 to receive the relevant electrical signals and with an output line, not shown in the drawings but known per se, to power the electric motor 11. In addition to the above, the control device 14 is configured to convert an electric pulse from a first one of said input lines 44 into a corresponding first power supply pulse of equal duration and make it available to the output line. The control device 14 is also configured to convert an electrical pulse from the second input line 44 into a corresponding second power supply pulse of equal duration and polarity opposite the polarity of said first power supply pulse and make it available to the output line.

In this way, it is possible to obtain a rotation of the electric motor 11 for a pre-established angle in one or the other direction by sending an electric pulse through one or the other input line 44 of the control device 14.

This allows the modification of the setting of the pilot device 24 through regulation pulses emitted by any type of control device normally used to control input and output solenoid valves in the regulation systems of the prior art. Such a control device is shown in FIG. 1 and is indicated by 32.

By way of example, a setting device 1 of the type described above may emit pulses having a duration of the order of 100-300 ms and an intensity of about 200 mA.

This makes it possible to achieve the further object to provide a setting device 1 which is completely interchangeable with the system with tank and solenoid valves according to the known art. In fact, it is sufficient to connect the two output lines 34 of the control device 32 to the two input lines 44 of the control device 14 of the setting device 1 instead of to the solenoid valves, for example through a jack 40 with which the setting device is equipped.

In particular, the control device 32 is configured to generate an electric pulse when a difference is generated between the pressure of the downstream area 27 and a pre-established setting pressure and to make said electric pulse available to either one of the two input lines 44 of the control device 14 depending on the sign of the above mentioned difference.

More specifically, when the opening of the shutter 35 of the pressure regulator 23 must be increased, the control device 32 sends an electric pulse to a first output line 34 of the control device 32, while a pulse corresponding to a request to reduce the aforementioned opening is sent to a second output line 34 of the control device 32.

With respect to the screw means, they preferably comprise a recirculating ball screw 7 equipped with a nut 9 which is integral with the setting plate 4 and operatively associated with the first shaft 8 by means of a plurality of balls, so that the rotation of the first shaft 8 causes a corresponding movement of the setting plate 4 along the longitudinal axis X.

Still preferably, the first shaft 8 is constrained to the tubular casing 2 according to the direction of the longitudinal axis X through a roller bearing 10. Preferably, the roller bearing 10 is a radial ball bearing, although different embodiments of the invention may include other equivalent types of bearings.

The recirculating ball screw 7 and the roller bearing 10 make it possible to minimize the friction of the adjusting unit 6, and therefore allow the power of the electric motor 11 needed to move the setting plate 4 to be decreased.

This enables the electric motor 11 to be activated using less power, in particular it enables the use of the same battery 43 that supplies power to the control device 32, without the need for additional power.

Preferably, the setting device 1 comprises a speed reducer 15 suited to connect the electric motor 11 to the second shaft 12. The speed reducer 15 advantageously makes it possible to significantly limit the torque required to drive the recirculating ball screw 7, thereby also limiting the power of the electric motor 11.

Still advantageously, the speed reducer 15 makes it possible to increase the adjustment accuracy of the setting device 1, since each pulse of the control device 32 corresponds to a very small rotation of the second shaft 12 and therefore to a correspondingly small displacement of the setting plate 4.

Preferably, the connection unit 13 that connects the first shaft 8 of the recirculating ball screw 7 to the second shaft 12 of the electric motor 11 comprises a first shaped element 16 belonging to one end of the first shaft 8 and a second shaped element 17 belonging to one end of the second shaft 12. The first shaped element 16 and the second shaped element 17 are removably associated with each other so as to transmit the rotation between the two shafts 8 and 12.

The removability between the two shaped elements 16 and 17 makes it possible to easily remove the actuating part of the setting device 1, that is, the electric motor 11, the speed reducer 15 and the second shaft 12, when it is necessary to replace it.

Preferably, the coupling between the first shaped element 16 and the second shaped element 17 is carried out with a clearance according to the direction of the longitudinal axis X. Advantageously, said axial clearance avoids the transmission of axial forces to the motor 11, forces which could hinder the operation of the motor itself.

Preferably, the first shaped element 16 and the second shaped element 17 comprise a groove developing along a direction which is orthogonal to the longitudinal axis X and a protruding body suited to be inserted in the groove. Preferably, the groove belongs to the first shaped element 16, while the protruding body belongs to the second shaped element 17, although it is evident that in variant embodiments of the invention the opposite may occur.

Still preferably, the second shaped element 17 is removably associated with the second shaft 12, for example by means of a grub screw.

Preferably, the setting device 1 also comprises an adjustable stop member 18 suited to restrict the movement of the setting plate 4 along the direction of the longitudinal axis X. Advantageously, the stop element 18 allows a minimum value to be set, preventing the delivery pressure from falling below a minimum threshold in the event of a malfunction of the control device 32.

Regarding the tubular casing 2, it preferably comprises a first portion 19 containing the electric motor 11 and the speed reducer 15 where present and a second portion 20 containing the recirculating ball screw 7 and removably associated with the first portion 19. Advantageously, the removability of the first portion 19 enables the replacement of the electric motor 11 and, in particular, of the speed reducer 15, in order to optimize them for use at different pressure ranges. Therefore, the invention achieves the object to provide a setting device 1 which can be easily adapted to a wide range of operating pressures.

Operatively and with reference to FIG. 1, a deviation of the pressure and/or temperature at the level of the downstream area 27 of the pipe 25 is detected by the control device 32 which determines the required correction and sends an electric pulse to the setting device 1 through a first output line 34 or, respectively, through the second output line 34, depending on the direction of the correction.

The control device 14 receives the electric pulse and converts it into a power supply pulse, the polarity of which depends on the output line 34 from which the pulse is received.

The power supply pulse drives the electric motor 11 in one of the two directions, causing the corresponding rotation of the recirculating ball screw 7, and hence the translation of the setting plate 4 along the longitudinal axis X, and the consequent variation of the force of the spring 5. This last force is transmitted through the movable body 3 to the regulating valve 30 of the pilot device 24, changing the size of the opening and thereby adjusting the control pressure feeding the motor chamber 37 of the pressure regulator 23, until the pre-established delivery pressure is reached in the downstream area 27.

Given the above, it is clear that the setting device described above and the control system that comprises it achieve all of the intended objects.

In fact, the replacement of the system including solenoid valves, tank and additional membrane used in the setting devices of the known type with an electric motor driven in both directions through signals transmitted through two different input lines makes it possible to modify the setting of the pilot device with greater precision compared to the results that can be obtained with the systems of the prior art, particularly in low pressure applications, while at the same time using the same signals normally used to control the two solenoid valves of the known system, so as to make the setting device of the invention interchangeable with the systems of the known type.

The absence of said components also results in a substantial simplification of the construction structure of the setting device of the invention compared to those of the known type.

The lack of a solenoid valve system also makes it possible to prevent the discharge of gas into the atmosphere during the adjustment of the setting of the pilot device.

The recirculating ball screw supported by a roller bearing further makes it possible to reduce the operating friction of the setting device and, consequently, to reduce the power required by the electric motor, making the latter compatible with the use of batteries, with no need for additional power sources.

In addition to the above, the ease of replacement of the setting device portion containing the electric motor and the speed reducer makes it easy to adapt the setting device to a wide range of operating pressures.

The invention claimed is:

1. A setting device for a pressure regulator, comprising:
    a tubular casing developed according to a longitudinal axis (X) and provided with an open first end;
    a movable body movably associated with said tubular casing in such a way that the movable body faces said open first end;
    a setting plate slidingly associated with said tubular casing according to a direction of said longitudinal axis (X);
    a spring interposed between said movable body and said setting plate;
    an adjusting unit suited to adjust a position of said setting plate according to said longitudinal axis (X);
    wherein said adjusting unit comprises:
        a first shaft rotatably associated with said tubular casing according to said longitudinal axis (X);
        screw means suited to connect said setting plate to said first shaft in such a way that rotations of said first shaft according to two mutually opposite directions cause corresponding movements of said setting plate along said longitudinal axis (X) according to the two mutually opposite directions;
        an electric motor provided with a second shaft rotatably constrained to said first shaft through a connection unit; and
        a control device suited to supply power to said electric motor;
        wherein said control device is provided with no more than two different input lines to receive corresponding electric signals and with an output line to supply power to said electric motor, said control device being configured to transmit an electric pulse emitted by any of said input lines to said output line, in such a way that, if said electric pulse comes from a first one of said input, said electric pulse is transmitted to said outlet line with a same polarity, while if said electric pulse comes from the second input line, said electric pulse is transmitted to said output line with an inverted polarity.

2. The setting device according to claim 1, wherein said screw means comprise a recirculating ball screw, said first shaft being rotatably associated with said tubular casing through a roller bearing.

3. The setting device according to claim 1, wherein said setting device comprises a speed reducer that connects said electric motor to said second shaft.

4. The setting device according to claim 1, wherein said connection unit comprises a first shaped element belonging to one end of said first shaft and a second shaped element belonging to one end of said second shaft, said first shaped element and said second shaped element being removably associated with each other in such a way as to allow the rotation to be transmitted from said second shaft to said first shaft.

5. The setting device according to claim 4, wherein said first shaped element and said second shaped element are configured in such a way as to define a mutual clearance according to said longitudinal axis (X).

6. The setting device according to claim 4, wherein said first shaped element and said second shaped element respectively comprise a groove developed according to a direction that is orthogonal to said longitudinal axis (X) and a protruding body that can be inserted in said groove, or vice versa.

7. The setting device according to claim 1, wherein said setting device comprises an adjustable stop member suited to limit the movements of said setting plate according to said longitudinal axis (X).

8. The setting device according to claim 1, wherein said tubular casing comprises a first portion containing said electric motor and a second portion containing a recirculating ball screw, said second portion being removably associated with said first portion.

9. The setting device according to claim 1, wherein said setting plate is rotatably constrained to said tubular casing according to said longitudinal axis (X) through one or more guide profiles.

10. A regulation system suited to regulate a pressure of a gas flowing through a pipe, comprising:
   a pressure regulator arranged along said pipe so as to identify in said pipe an upstream area and a downstream area with respect to said pressure regulator;
   a pilot device connected to said pipe through an inlet duct and to said pressure regulator through an outlet duct, said pilot device being provided with a regulating valve interposed between said inlet duct and said outlet duct and operated by a membrane subject to a corresponding control pressure;
   a setting unit suited to exert a counteracting force on said regulating valve and suited to be operated to modify said counteracting force;
   wherein said setting unit comprises the setting device according to claim 1, whose movable body is associated with said regulating valve of said pilot device in such a way as to transmit a force of said spring of said setting device to said regulating valve.

11. The regulation system according to claim 10, wherein the control device of the setting unit is configured to emit the electric pulse when a difference is generated between a pressure in said downstream area and a predefined setting pressure, and to selectively transmit said electric pulse to one or the other of the two inlet lines of the control device of said setting device according to a sign of said difference.

* * * * *